US009922580B2

United States Patent
Mathews et al.

(10) Patent No.: US 9,922,580 B2
(45) Date of Patent: Mar. 20, 2018

(54) APPARATUS AND METHOD FOR THE VIRTUAL DEMONSTRATION OF A SMART PHONE CONTROLLED SMART HOME USING A WEBSITE

(71) Applicant: GOOGLE INC., Mountain View, CA (US)

(72) Inventors: Jeffrey P. Mathews, Longmont, CO (US); Andrew J. Zimmer, Boulder, CO (US)

(73) Assignee: GOOGLE LLC, Mountain View, CA (US)

( * ) Notice: Subject to any disclaimer, the term of this patent is extended or adjusted under 35 U.S.C. 154(b) by 730 days.

(21) Appl. No.: 14/265,121

(22) Filed: Apr. 29, 2014

(65) Prior Publication Data

US 2014/0324410 A1  Oct. 30, 2014

Related U.S. Application Data

(60) Provisional application No. 61/817,778, filed on Apr. 30, 2013.

(51) Int. Cl.
*G09B 25/00* (2006.01)
*G09B 9/00* (2006.01)
(Continued)

(52) U.S. Cl.
CPC ......... *G09B 25/00* (2013.01); *G06Q 30/0278* (2013.01); *G09B 9/00* (2013.01);
(Continued)

(58) Field of Classification Search
CPC combination set(s) only.
See application file for complete search history.

(56) References Cited

U.S. PATENT DOCUMENTS 4,049,973 A    9/1977  Lambert
5,838,226 A   11/1998  Houggy
(Continued)

OTHER PUBLICATIONS

Goadrich, Mark H., and Michael P. Rogers. "Smart smartphone development: iOS versus Android." In Proceedings of the 42nd ACM technical symposium on Computer science education, pp. 607-612. ACM, 2011.*

(Continued)

*Primary Examiner* — Aniss Chad
(74) *Attorney, Agent, or Firm* — Morgan, Lewis & Bockius LLP

(57) ABSTRACT

An apparatus providing for virtual use of one or more virtualized smart home devices. The apparatus includes a simulation app download element and a web host. The simulation app download element is disposed in a cloud-based file server, and is configured to download a simulation app to a smart phone that is collocated with a computer, upon which the one or more virtualized smart home devices are simulated. The web host is disposed in the cloud-based file server, and is configured to provide content to the computer to simulate the one or more virtualized smart home devices and, responsive to control commands transmitted via the simulation app, is configured to transmit corresponding control commands to the computer that change simulated states of the one or more virtualized smart home devices such that a user experiences control of the one or more virtualized smart home devices.

23 Claims, 3 Drawing Sheets

SMART PHONE CONTROLLED SMART HOME DEMONSTRATION MECHANISM

(51) Int. Cl.
  *H04L 12/28* (2006.01)
  *G06Q 30/02* (2012.01)
(52) U.S. Cl.
  CPC .......... *H04L 12/282* (2013.01); *H04L 12/283* (2013.01); *H04L 2012/2841* (2013.01)

(56) References Cited

U.S. PATENT DOCUMENTS

| | | |
|---|---|---|
| 6,597,396 B1 | 7/2003 | Quendt |
| 7,260,597 B1 | 8/2007 | Hofrichter et al. |
| 7,352,930 B2 | 4/2008 | Lowles |
| 7,570,485 B2 | 8/2009 | Krah |
| 7,830,258 B2 | 11/2010 | McAllister |
| 7,953,327 B2 | 5/2011 | Pereira et al. |
| 7,965,983 B1 | 6/2011 | Swan et al. |
| 8,049,434 B2 | 11/2011 | Crouse et al. |
| 8,096,695 B2 | 1/2012 | Ong |
| 8,156,500 B2 * | 4/2012 | Helander .............. G06F 9/4887 703/22 |
| 8,161,420 B2 | 4/2012 | Ding |
| 8,204,979 B2 | 6/2012 | Vutharkar et al. |
| 8,228,198 B2 | 7/2012 | McAllister |
| 8,265,674 B2 | 9/2012 | Choong et al. |
| 8,279,158 B2 | 10/2012 | Lowles et al. |
| 8,295,990 B2 | 10/2012 | Venkatakrishnan et al. |
| 8,370,370 B2 | 2/2013 | Huang et al. |
| 8,406,819 B2 | 3/2013 | Steer et al. |
| 8,407,347 B2 | 3/2013 | Zhang et al. |
| 8,409,001 B2 | 4/2013 | Chang |
| 8,471,500 B2 | 6/2013 | Fletcher et al. |
| 8,478,450 B2 | 7/2013 | Lu et al. |
| 8,508,465 B2 | 8/2013 | Broga et al. |
| 8,519,844 B2 | 8/2013 | Richey et al. |
| 8,543,688 B1 | 9/2013 | Ramamurthy |
| 8,576,276 B2 | 11/2013 | Bar-zeev et al. |
| 8,606,645 B1 | 12/2013 | Applefeld |
| 8,613,070 B1 | 12/2013 | Borzycki et al. |
| 8,688,392 B2 | 4/2014 | Tam et al. |
| 8,823,795 B1 | 9/2014 | Scalisi et al. |
| 8,942,694 B2 | 1/2015 | Woo |
| 9,009,805 B1 | 4/2015 | Kirkby et al. |
| 9,207,659 B1 | 12/2015 | Sami |
| 9,325,516 B2 | 4/2016 | Pera et al. |
| 9,326,126 B2 | 4/2016 | Yang |
| 9,401,901 B2 | 7/2016 | Huang et al. |
| 9,412,266 B2 | 8/2016 | Chen et al. |
| 9,419,871 B2 | 8/2016 | Foley et al. |
| 9,462,624 B2 | 10/2016 | Logue |
| 9,479,504 B2 | 10/2016 | Bae et al. |
| 9,488,994 B2 | 11/2016 | Zywicki et al. |
| 9,528,861 B1 | 12/2016 | Haupt et al. |
| 9,547,980 B2 | 1/2017 | Chen et al. |
| 9,554,061 B1 | 1/2017 | Proctor, Jr. |
| 2002/0016639 A1 | 2/2002 | Smith et al. |
| 2003/0061284 A1 | 3/2003 | Mandarino et al. |
| 2003/0169728 A1 | 9/2003 | Choi |
| 2004/0083393 A1 | 4/2004 | Jordan et al. |
| 2004/0243257 A1 | 12/2004 | Theimer |
| 2005/0041686 A1 | 2/2005 | Roy et al. |
| 2005/0281277 A1 | 12/2005 | Killian |
| 2006/0109988 A1 | 5/2006 | Metcalf |
| 2006/0174102 A1 | 8/2006 | Smith et al. |
| 2006/0259183 A1 | 11/2006 | Hayes et al. |
| 2007/0014303 A1 | 1/2007 | Schulz et al. |
| 2007/0250592 A1 | 10/2007 | Reckamp et al. |
| 2007/0294335 A1 | 12/2007 | Gershom |
| 2008/0037444 A1 | 2/2008 | Chhabra |
| 2008/0089300 A1 | 4/2008 | Yee |
| 2008/0122606 A1 | 5/2008 | Bradley |
| 2008/0219672 A1 | 9/2008 | Tam et al. |
| 2009/0070681 A1 | 3/2009 | Dawes et al. |
| 2009/0080896 A1 | 3/2009 | Pereira et al. |
| 2009/0244097 A1 | 10/2009 | Estevez |
| 2010/0068997 A1 | 3/2010 | Dunko |
| 2010/0130166 A1 | 5/2010 | Tsuria et al. |
| 2010/0138007 A1 | 6/2010 | Clark et al. |
| 2010/0141153 A1 | 6/2010 | Recker et al. |
| 2010/0192212 A1 | 7/2010 | Raleigh |
| 2010/0246825 A1 | 9/2010 | Baras et al. |
| 2010/0248707 A1 | 9/2010 | Hoffner et al. |
| 2010/0283579 A1 | 11/2010 | Kraus et al. |
| 2010/0283584 A1 | 11/2010 | McAllister |
| 2011/0107364 A1 | 5/2011 | Lajoie et al. |
| 2011/0121654 A1 | 5/2011 | Recker et al. |
| 2011/0172844 A1 | 7/2011 | Choong et al. |
| 2011/0199004 A1 | 8/2011 | Henig et al. |
| 2011/0202151 A1 | 8/2011 | Covaro et al. |
| 2011/0225373 A1 | 9/2011 | Ito et al. |
| 2012/0011567 A1 | 1/2012 | Cronk et al. |
| 2012/0049765 A1 | 3/2012 | Lu et al. |
| 2012/0082062 A1 | 4/2012 | McCormack |
| 2012/0144469 A1 | 6/2012 | Ainslie et al. |
| 2012/0167063 A1 | 6/2012 | Detwiler et al. |
| 2012/0216296 A1 | 8/2012 | Kidron |
| 2012/0239936 A1 | 9/2012 | Holtmanns et al. |
| 2013/0026947 A1 | 1/2013 | Economy et al. |
| 2013/0064132 A1 | 3/2013 | Low et al. |
| 2013/0076491 A1 | 3/2013 | Brandsma et al. |
| 2013/0041516 A1 | 4/2013 | Rockenfeller et al. |
| 2013/0086665 A1 | 4/2013 | Filippi et al. |
| 2013/0124855 A1 | 5/2013 | Varadarajan et al. |
| 2013/0198786 A1 | 8/2013 | Cook et al. |
| 2013/0227656 A1 | 8/2013 | Holtmanns et al. |
| 2013/0236183 A1 | 9/2013 | Chao et al. |
| 2013/0268357 A1 | 10/2013 | Heath |
| 2013/0276140 A1 | 10/2013 | Coffing et al. |
| 2013/0340050 A1 | 12/2013 | Harrison |
| 2014/0007222 A1 | 1/2014 | Qureshi et al. |
| 2014/0068705 A1 | 3/2014 | Chambers et al. |
| 2014/0068789 A1 | 3/2014 | Watts et al. |
| 2014/0099933 A1 | 4/2014 | Yerrabommanahalli et al. |
| 2014/0129006 A1 | 5/2014 | Chen et al. |
| 2014/0137188 A1 | 5/2014 | Bartholomay et al. |
| 2014/0157370 A1 | 6/2014 | Plattner et al. |
| 2014/0164758 A1 | 6/2014 | Ramamurthy |
| 2014/0164776 A1 | 6/2014 | Hook et al. |
| 2014/0173692 A1 | 6/2014 | Srinivasan et al. |
| 2014/0189808 A1 | 7/2014 | Mahaffey et al. |
| 2014/0245411 A1 | 8/2014 | Meng et al. |
| 2014/0245461 A1 | 8/2014 | O'Neill et al. |
| 2014/0248852 A1 | 9/2014 | Raleigh et al. |
| 2014/0266600 A1 | 9/2014 | Alberth, Jr. et al. |
| 2014/0273963 A1 | 9/2014 | Su et al. |
| 2014/0281497 A1 | 9/2014 | Medvinsky et al. |
| 2014/0282570 A1 | 9/2014 | Prasanna |
| 2014/0282877 A1 | 9/2014 | Mahaffey et al. |
| 2014/0310509 A1 | 10/2014 | Potlapally et al. |
| 2014/0310510 A1 | 10/2014 | Potlapally et al. |
| 2015/0015369 A1 | 1/2015 | Lamb |
| 2015/0071052 A1 | 3/2015 | Hershberg et al. |
| 2015/0126153 A1 | 5/2015 | Spitz et al. |
| 2015/0215297 A1 | 7/2015 | Rathod et al. |
| 2015/0282216 A1 | 10/2015 | Reshef et al. |
| 2016/0044032 A1 | 2/2016 | Kim et al. |
| 2016/0089457 A1 | 3/2016 | Liao |
| 2016/0132031 A1 | 5/2016 | Kozura et al. |
| 2016/0380945 A1 | 12/2016 | Wood et al. |
| 2016/0381500 A1 | 12/2016 | Larson |

OTHER PUBLICATIONS

Manashty, Ali Reza, Amir Rajabzadeh, and Zahra Forootan Jahromi. "A Scenario-Based Mobile Application for Robot-Assisted Smart Digital Homes." arXiv preprint arXiv:1009.5398 (2010).*
Armac, Ibrahim, and Daniel Retkowitz. "Simulation of smart environments." In IEEE International Conference on Pervasive Services, pp. 257-266. IEEE, 2007.*
Ramlee, Ridza Azri, Man Hong Leong, Ranjit Singh A. Sarban Singh, Mohd Muzafar Ismail, Mohd Azlishah Othman, Hamzah Asyrani Sulaiman, Mohamad Harris Misran, Meor Said, and Maizatul Alice. "Bluetooth remote home automation system using android application." (2013): 1-5.*

(56) References Cited

OTHER PUBLICATIONS

Van Nguyen, Tam, Jin Gook Kim, and Deokjai Choi. "ISS: the interactive smart home simulator." In Advanced Communication Technology, 2009. ICACT 2009. 11th International Conference on, vol. 3, pp. 1828-1833. IEEE, 2009.*

Rajabzadeh, Amir, Ali Reza Manashty, and Zahra Forootan Jahromi. "A Mobile Application for Smart House Remote Control System." arXiv preprint arXiv:1009.5557 (2010).*

Gavalas, Damianos, and Daphne Economou. "Development platforms for mobile applications: Status and trends." IEEE software 28, No. 1 (2011): 77-86.*

Jahromi, Zahra Forootan, Amir Rajabzadeh, and Ali Reza Manashty. "A multi-purpose scenario-based simulator for smart house environments." arXiv preprint arXiv:1105.2902 (2011). Harvard.*

Lertlakkhanakul, Jumphon, Jin Won Choi, and Mi Yun Kim. "Building data model and simulation platform for spatial interaction management in smart home." Automation in Construction 17, No. 8 (2008): 948-957.*

Detailed Technical Specification of Security for Heterogeneous Access, May 31, 2002, 161 pgs, www.isrc.rhul.ac.uk/shaman/docs/d09v1.pdf.

Google Inc., International Search Report and Written Opinion, PCT/US2015/053291, Feb. 5, 2016, 18 pgs.

Google Inc., International Search Report and Written Opinion, PCT/US2015/060405, Feb. 25, 2016, 9 pgs.

Y. Zatout, "Using wireless technologies for healthcare monitoring at home: A survey," 2012 IEEE 14th International Conference on e-Health Networking, Applications and Services (Healthcom), Beijing, 2012, pp. 383-386. URL: http://ieeexplore.ieee.org/stamp/stamp.isp?tp=&arnumber=6379443&isnumber=6379371.

"INSTEON Compared" www.insteon.com/pdf/insteoncompared.pdf version.2 2013.

"Thread Group Information Event" https://www.threadgroup.org/Portals/O/documents/events/ThreadIntro.pdf; Sep. 30, 2014.

* cited by examiner

PRESENT DAY SMART HOME DEMONSTRATION TECHNIQUE

SMART PHONE CONTROLLED SMART HOME DEMONSTRATION MECHANISM

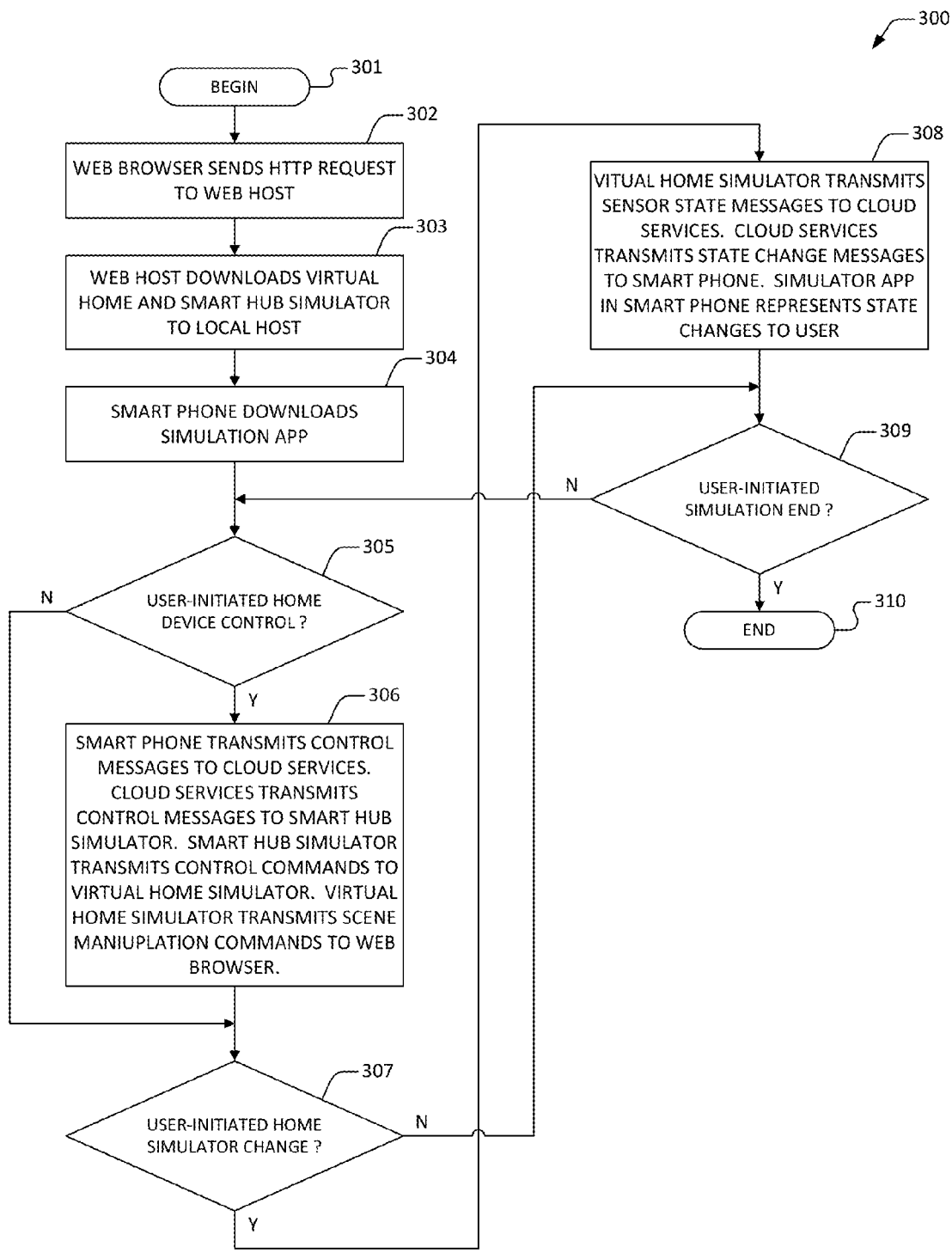

APPARATUS AND METHOD FOR THE VIRTUAL DEMONSTRATION OF A SMART PHONE CONTROLLED SMART HOME USING A WEBSITE

CROSS-REFERENCE TO RELATED APPLICATIONS

This application claims the benefit of the following U.S. Provisional Application, which is herein incorporated by reference for all intents and purposes.

| SER. NO. | FILING DATE | TITLE |
|---|---|---|
| 61817778 (RVLV.0106) | Apr. 30, 2013 | METHOD FOR THE VIRTUAL DEMONSTRATION OF A SMART PHONE CONTROLLED SMART HOME USING A WEBSITE |

BACKGROUND OF THE INVENTION

Field of the Invention

This invention relates in general to the field of home automation, and more particularly to an apparatus and method for affecting a virtual smart phone controlled smart home demonstration.

Description of the Related Art

At this point in history, so-called smart home automation devices are being developed and fielded at such a rapid pace that new devices appear on the market every single day. Because of the proliferation of low-power wireless network and smart phone technologies, it is presently not uncommon to find home and business owners in possession of smart home devices such as wireless lights, music systems, door locks, thermostats and alarm systems. And wireless white goods are just over the horizon. Five years from now, it is expected that the average consumer will own five to ten smart home devices.

While there are many challenges associated with fielding and operation of smart home devices, this application focuses on the problems associated with educating consumers and the sales force about the usage and benefits of smart home devices. Outside of web sites that provide technical information and animations of these types of devices, presently there are only two ways that a potential consumer or representative may actually see how these devices are used. The first is at a live demonstration, such as a tradeshow, where potential users are allowed to use the devices in a set up smart home environment. And while this is the best way to "test drive" these devices, it certainly doesn't reach a very wide audience for only a select few people attend tradeshows.

The only other way that a potential user may experience a smart home environment is to view a video of a live demonstration. And while video demonstrations clearly reach a much wider audience than live demonstrations, they don't provide the viewers of the demonstration with a "hands on" experience.

Accordingly, what is needed is a technique that enables a potential user to experience the use of one or more smart home devices in a smart home environment, where the experience is perfected in a virtual simulation.

In addition, what is needed is a mechanism that allows a potential user in possession of a computer and a smart phone to easily download a virtual smart home environment to the computer, and to use virtualized devices in the smart home environment by employing an app on their smart phone.

SUMMARY OF THE INVENTION

The present invention, among other applications, is directed to solving the above-noted problems and addresses other problems, disadvantages, and limitations of the prior art.

The present invention provides a superior technique for demonstration of one or more smart home devices in a virtualized environment. In one embodiment, an apparatus provides for virtual use of one or more virtualized smart home devices. The apparatus includes a simulation app download element and a web host. The simulation app download element is disposed in a cloud-based file server, and is configured to download a simulation app to a smart phone that is collocated with a computer, upon which the one or more virtualized smart home devices are simulated. The web host is disposed in the cloud-based file server, and is configured to provide content to the computer to simulate the one or more virtualized smart home devices and, responsive to control commands transmitted via the simulation app, is configured to transmit corresponding control commands to the computer that change simulated states of the one or more virtualized smart home devices such that a user experiences control of the one or more virtualized smart home devices.

One aspect of the present invention contemplates an apparatus that provides for virtual use of one or more virtualized smart home devices. The apparatus includes a cloud-based file server that is coupled to a wide area network and to a cellular network. The cloud-based file server has a simulation app download element and a web host. The simulation app download element is configured to download a simulation app to a smart phone that is collocated with a computer, upon which the one or more virtualized smart home devices are simulated. The web host is configured to provide content to the computer over the Internet to simulate the one or more virtualized smart home devices and, responsive to control commands transmitted via the simulation app over the cellular network, is configured to transmit corresponding control commands to the computer via the Internet that change simulated states of the one or more virtualized smart home devices such that a user experiences control of the one or more virtualized smart home devices.

Another aspect of the present invention comprehends a method that provides for virtual use of one or more virtualized smart home devices. The method includes employing a cloud-based file server to download a simulation app to a smart phone that is collocated with a computer, upon which the one or more virtualized smart home devices are simulated; and executing a web host disposed within the cloud-based file server to provide content to the computer to simulate the one or more virtualized smart home devices and, responsive to control commands transmitted via the simulation app, to transmit corresponding control commands to the computer that change simulated states of the one or more virtualized smart home devices such that a user experiences control of the one or more virtualized smart home devices.

BRIEF DESCRIPTION OF THE DRAWINGS

These and other objects, features, and advantages of the present invention will become better understood with regard to the following description, and accompanying drawings where:

FIG. 3 is a flow diagram featuring a method according to the present invention for conducting a virtual smart phone controlled smart home demonstration.

DETAILED DESCRIPTION

Figure 1:
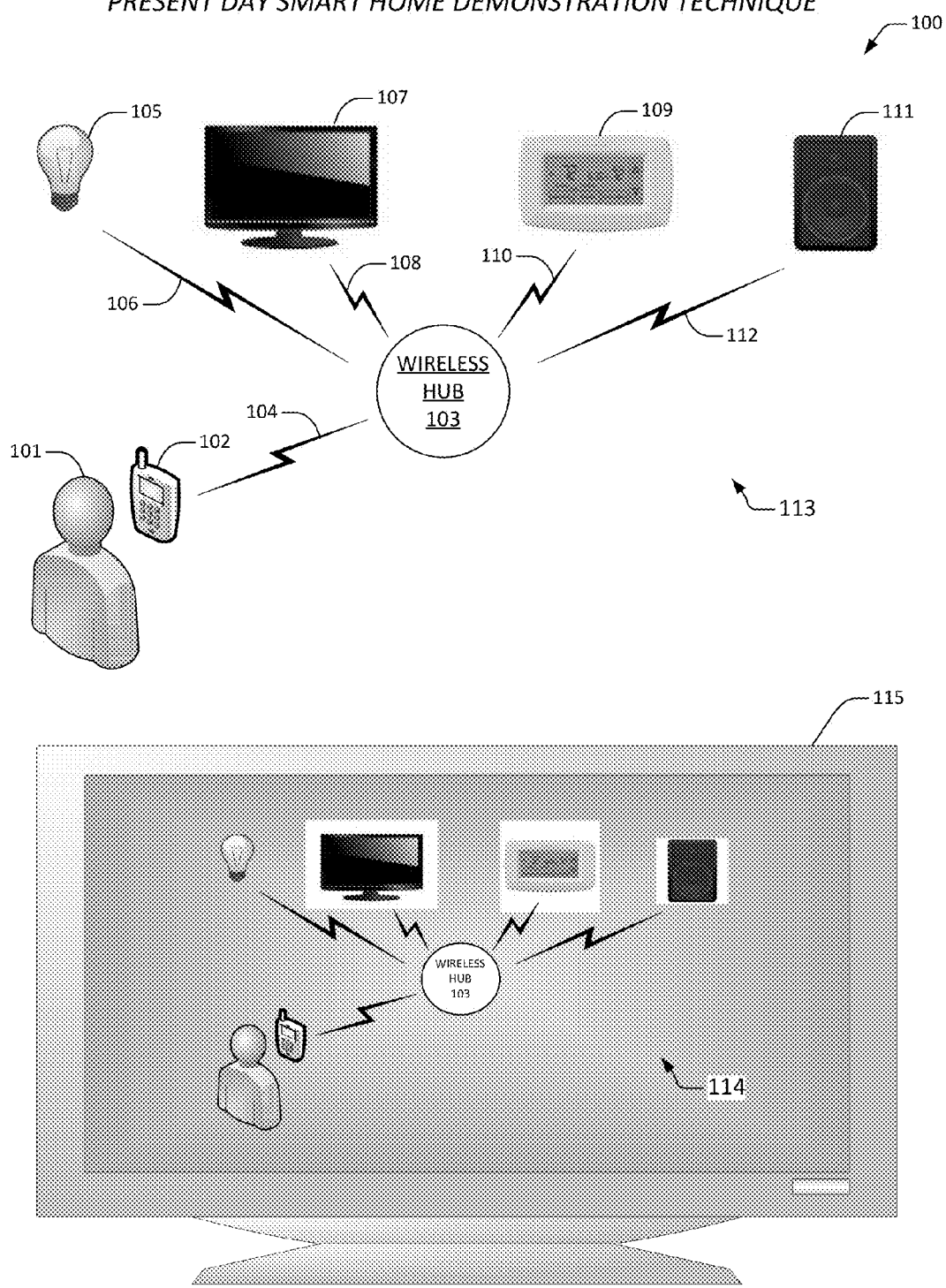
FIG. 1 is a block diagram illustrating a present day smart home demonstration technique.

Exemplary and illustrative embodiments of the invention are described below. In the interest of clarity, not all features of an actual implementation are described in this specification, for those skilled in the art will appreciate that in the development of any such actual embodiment, numerous implementation specific decisions are made to achieve specific goals, such as compliance with system-related and business related constraints, which vary from one implementation to another. Furthermore, it will be appreciated that such a development effort might be complex and time-consuming, but would nevertheless be a routine undertaking for those of ordinary skill in the art having the benefit of this disclosure. Various modifications to the preferred embodiment will be apparent to those skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The present invention will now be described with reference to the attached figures. Various structures, systems, and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase (i.e., a definition that is different from the ordinary and customary meaning as understood by those skilled in the art) is intended to be implied by consistent usage of the term or phrase herein. To the extent that a term or phrase is intended to have a special meaning (i.e., a meaning other than that understood by skilled artisans) such a special definition will be expressly set forth in the specification in a definitional manner that directly and unequivocally provides the special definition for the term or phrase.

Definitions

Integrated Circuit (IC): A set of electronic circuits fabricated on a small piece of semiconductor material, typically silicon. An IC is also referred to as a chip, a microchip, or a die.

Central Processing Unit (CPU): The electronic circuits (i.e., "hardware") that execute the instructions of a computer program (also known as a "computer application" or "application") by performing operations on data that include arithmetic operations, logical operations, and input/output operations.

Microprocessor: An electronic device that functions as a CPU on a single integrated circuit. A microprocessor receives digital data as input, processes the data according to instructions fetched from a memory (either on-die or off-die), and generates results of operations prescribed by the instructions as output. A general purpose microprocessor may be employed in a desktop, mobile, or tablet computer, and is employed for uses such as computation, text editing, multimedia display, and Internet browsing. A microprocessor may also be disposed in an embedded system to control a wide variety of devices including appliances, mobile telephones, smart phones, and industrial control devices.

Instruction Set Architecture (ISA) or Instruction Set: A part of a computer architecture related to programming that includes data types, instructions, registers, addressing modes, memory architecture, interrupt and exception handling, and input/output. An ISA includes a specification of the set of opcodes (i.e., machine language instructions), and the native commands implemented by a particular CPU.

Microcode: A term employed to refer to a plurality of micro instructions. A micro instruction (also referred to as a "native instruction") is an instruction at the level that a microprocessor sub-unit executes. Exemplary sub-units include integer units, floating point units, MMX units, and load/store units. For example, micro instructions are directly executed by a reduced instruction set computer (RISC) microprocessor. For a complex instruction set computer (CISC) microprocessor, macro instructions are translated into associated micro instructions, and the associated micro instructions are directly executed by a sub-unit or sub-units within the CISC microprocessor.

In view of the above background discussion on smart home demonstrations, a discussion of the disadvantages and limitations of these present day techniques will be presented with reference to FIG. 1. Following this, a discussion of the present invention will be presented with reference to FIGS. 2-3. In addition to overcoming the disadvantages and limitations exhibited by present day demonstration mechanisms, the present invention provides for substantially enhanced value proposition communication to potential customers for physical devices in a smart home being controlled by a smart phone.

Turning to FIG. 1, a block diagram 100 is presented illustrating a present day smart home demonstration technique. The diagram 100 depicts a demonstrator 101 having control of a smart phone 102 for purposes of performing a demonstration of sensing and controllable devices 105, 107, 109, 111 that may be disposed in a so-called smart home system. The devices 105, 107, 109, 111 include, but are not limited to, the following: wirelessly and/or remotely controlled lights 105, switches (not shown), outlets (not shown), pumps (not shown), security cameras (not shown), occupancy sensors (not shown), door switches (not shown), music systems 111, door locks (not shown), thermostats 109, televisions 107, garage door openers (not shown), weather sensing equipment (not shown), gas/water/electric meters (not shown), white-goods (not shown), sprinkler controllers (not shown), smoke alarms (not shown), and a number of various sensors (e.g., water, temperature, light, humidity, occupancy, motion) (not shown). The diagram 100 shows a wireless hub 103 that is coupled to the smart phone 102 via wireless link 104, to the light 105 via wireless link 106, to the television 107 via wireless link 108, to the thermostat 109 via wireless link 110, and to the music system 111 via wireless link 112. As one skilled in the art will appreciate, present day links 104, 106, 108, 110, 112 that are employed to communicate with and control smart home devices 103, 105, 107, 109, 111 include, but are not limited to, IrDA, NEC®, BLUETOOTH® and Bluetooth Low Energy, IEEE 802.15.4, ZIGBEE®, Z-WAVE®, INSTEON®, X10®, 802.11, WiFi®, Proprietary 433 MHz, and Proprietary 900 MHz. In addition, although wireless links 104, 106, 108, 110, 112 are depicted in the diagram 100, one skilled in the art will also appreciate that one or more of the links 104, 106, 108, 110, 112 may comprise wired links including, but not limited to, Ethernet and similar protocols. The present inventors note that the specific devices 103, 105, 107, 109, 111 and links 104, 106, 108, 110, 112 depicted in the diagram 100 are provided as examples to clearly teach aspects of the present invention, and are by not means exhaustive of smart home technologies.

In operation, a smart phone application (not shown) executes on the smart phone 102, allowing the demonstrator 101 to activate, deactivate, receive sensed information from, and control attributes of the various devices 105, 107, 109, 111 by employing conventional user-interface mechanisms seen in many present day smart phone applications. When the demonstrator 101 triggers one or more of the user-interface mechanisms, the smart phone application directs transceivers (not shown) in the smart phone 102 to communicate hub control commands to the wireless hub 103 via link 104 and, in turn, the wireless hub 103 sends corresponding device control commands over one or more of links 106, 108, 110, 112 to one or more devices 105, 107, 109, 111 that direct the one or more devices 105, 107, 109, 111 to perform control operations (e.g., dim, channel change, temperature decrease, volume increase) that correspond to the triggered one or more user-interface mechanisms. In addition, when the one or more devices 105, 107, 109, 111 change state, they send state change commands to the wireless hub 103, and the wireless hub communicates these state changes to the smart phone, where the smart phone application presents these state changes to the demonstrator 101 via the conventional user-interface mechanisms.

The focus of the present application is not directed towards the cornucopia of devices and options available for home automation, but rather to the techniques that are employed to demonstrate those devices, as installed, to potential buyers and to those in associated sales and marketing channels. Thus, the diagram 100 depicts a live demonstration scenario 113 and a video scenario 114 of the live demonstration 113 that is being played back on a video device 115 such as a computer monitor. As one skilled in the art will appreciate, live demonstrations 113 are typically conducted at tradeshows and other venues whose attendance can justify the significant travel and labor costs associated therewith. And for those who cannot attend these live demonstrations 113, video scenarios 114 are provided, typically over the web, that show certain predefined control features of a home automation system. In addition to live demonstrations 113 and video scenarios 114, websites abound with simulated demonstrations of certain devices and/or systems, though the simulated demonstrations are not interactive.

The present inventors have observed that prior demonstration techniques such as those described above are disadvantageous in several respects. First, attendance at a live demonstration 113 may not be feasible even in country; it is impossible to provide a live demonstration 113 to a worldwide audience. In addition, for both video scenarios 114 and simulated demonstrations, customers and sales representatives are only allowed to see and hear pre-canned demonstration features. That is, the viewer of a video scenario 114 or simulated demonstration is entirely precluded from a realistic "hands-on" experience of controlling devices and experiencing their sensed states in a smart home environment. Consequently, the present inventors liken these present day demonstration mechanisms to being excluded from test driving a car prior to purchase without being allowed to drive the car itself. Such is the unfortunate case for the demonstration of present day home automation devices.

The present invention overcomes the above noted disadvantages and limitations, and others, by providing an apparatus and method for virtual demonstration of a smart phone controlled smart home. In addition to allowing for hands-on experience, the present invention allows potential users and sales channel personnel access to the hands-on experience virtually anywhere that internet and cellular connectivity exists. The present invention will now be described with reference to FIGS. 2-3.

Figure 2:
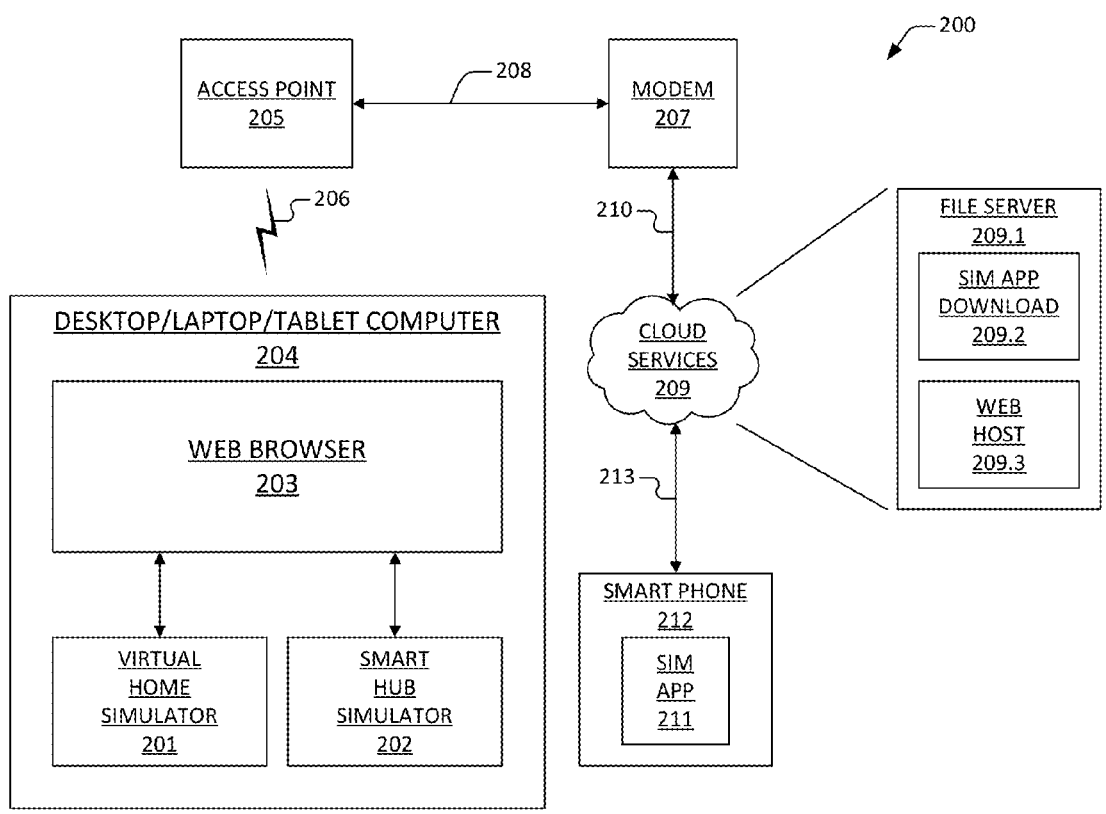
FIG. 2 is a block diagram depicting a smart phone controlled smart home demonstration mechanism according to the present invention.

Turning to FIG. 2, a block diagram is presented depicting a smart phone controlled smart home demonstration mechanism 200 according to the present invention. The mechanism 200 includes a computer 204 that is coupled to an access point 205 via a wireless link 206. In one embodiment, the computer 204 comprises a desktop computer. Another embodiment comprises a laptop computer. A further embodiment comprises a tablet computer. The access point 205 may be a conventional wireless access point that couples to wireless devices such as the computer via an IEEE 802.11 wireless link 206. Other embodiments contemplate other well known wireless technologies such as Bluetooth, ZigBee, and the like. Further embodiments comprehend an access point 205 that provides a wired link 206 such as Ethernet.

The computer 204 may include a web browser 203 that is coupled to a virtual home simulator 201 and a smart hub simulator 202. The computer may utilize any one of the well known operating systems such as WINDOWS®, APPLE®, LINUX®, IOS®, or ANDROID®, and the web browser 203 may comprise any one of the well known browsers such as INTERNET EXPLORER®, SAFARI®, FIREFOX®, or CHROME®. In one embodiment, the home simulator 201 and the hub simulator 202 comprise application programs utilizing hypertext markup language (HTML), JAVASCRIPT®, PHP®, PERL®, and/or Cascading Style Sheets (CSS), or a combination thereof that execute on the computer 204 to present animated video and audio to a user (not shown) via the web browser 203.

The access point 205 is coupled to a modem 207 via bus 208. In one embodiment, the access point 205 and modem 207 may be disposed within the same device enclosure. The modem 207 may couple to a wide area network such as the INTERNET via bus 210, and the modem 207 and bus 210 may employ conventional modulation protocols such as digital subscriber line (DSL), cable, wireless point-to-point, etc.

At a designated internet protocol (IP) address for a simulation website, cloud services 209 are disposed according to the present invention. The cloud services 209 comprise a file server 209.1. The file server 209.1 comprises a simulation application download element 209.2 and a web host 209.3. The download element 209.2 and the web host 209.3 may comprise a combination of computing devices and application programs executing thereon to perform the functions and operations as will be described below.

Collocated with the computer 204 is a smart phone 212 having a simulation application 211 disposed therein, and the smart phone 201 is coupled to the cloud services 209 via wireless link 213. In one embodiment, the wireless link 213 comprises a cellular network. In another embodiment, the wireless link 213 comprises an IEEE 802.11 wireless link that is accessed via the access point 205.

In operation, the user may direct the web browser 203 to the IP address of the cloud services 209 via employing an address or hyperlink to a domain name for the cloud services. Accordingly the web host 209.3 provides content to the browser 203 such that the user is enabled to select to download the home simulator 201 and the hub simulator 202 onto the computer 204. Similarly, the user is enabled to employ the simulation application download element 209.2 to download the simulation application 211 to the smart phone 212. In one embodiment, the download comprises a jar file. In another embodiment, the download comprises an iOS enterprise distribution. In yet another embodiment, the download comprises an Apple App Store hosted mobile application.

After download, the home and hub simulators 201-202 execute on the computer 204 to create an instantiation of a virtual smart home in the web browser 203. The home simulator 201 may simulate a wide variety of smart home devices as are alluded to above, and the hub simulator 202 may simulate a smart home hub such as the hub 103 of FIG. 1. Furthermore, the simulation app 211 may execute on the smart phone 212 to simulate the controls and displays that are presently employed by a user to communicate smart home device control commands to the hub that is simulated by the hub simulator 202 and to receive state changes of the smart home devices (e.g., light switch is thrown, occupancy sensor senses occupancy, etc.) that are received by the hub simulator 202. Thus, the user is provided with the capability to control and receive state information of the smart home devices that are virtualized by the home simulator 201. Rather than sending control commands directly to a smart home hub, such as is described with reference to FIG. 1, the commands are transmitted over link 213 to the cloud services 209 and the web host 209.3 issues commands over the INTERNET that are received by the home and hub simulators 201-202 which, in responsive execution, manipulate video and audio of scenes depicted in the web browser 203 such that the controls initiated by the user using the simulation app 211 are perfected in one or more virtualized smart home devices presented by the web browser 203. For state changes, the user may initiate the changes via selections in the web browser 203, which are communicated by the home and hub simulators 201-202, which are transmitted to the cloud services via link 210, and which are communicated to the smart phone 212 via link 213. The simulation app 211 executing thereon will then announce the state changes via video/audio alerts and messages.

In one embodiment, the simulation application 211 is substantially similar to a smart home mobile application that may execute to control and sense state changes of devices in a real smart home, but rather it receives state changes from and directs control commands to the virtual smart home that exists only in the web browser 203.

The smart hub simulator 202 creates an instantiation of a virtualized hub, and operates to produce application layer messaging and transport acknowledgements just as are expected from the simulation application 211 executing on the smart phone 212. The home simulator 201 operates to display projections of smart home devices appropriate for a smart home experience, and the projections are driven by the hub simulator 202. Such displays include, but are not limited to, machine-to-machine operations for virtual geo-fencing, and virtual states for any of a number of smart home devices as described above. In one embodiment, the home simulator 201 enables the user to select a plurality of smart home devices for simulation via the web browser 203.

Accordingly, the user is allowed to experience hands-on use of smart devices within a smart home environment by using a simulation application 211 on a smart phone 212 that is substantially similar to a smart home application that may be employed to control devices in a real smart home environment.

The mechanism 200 according to the present invention is configured to perform the functions and operations as discussed above. The mechanism 200 comprises logic, circuits, devices, or microcode (i.e., micro instructions or native instructions), or a combination of logic, circuits, devices, or microcode, or equivalent elements that are employed to execute the functions and operations according to the present invention as noted. The elements employed to accomplish these operations and functions within the mechanism 200 may be shared with other circuits, microcode, etc., that are employed to perform other functions and/or operations within the mechanism 200. According to the scope of the present application, microcode is a term employed to refer to a plurality of micro instructions. A micro instruction (also referred to as a native instruction) is an instruction at the level that a unit executes. For example, micro instructions are directly executed by a reduced instruction set computer (RISC) microprocessor. For a complex instruction set computer (CISC) microprocessor, macro instructions are translated into associated micro instructions, and the associated micro instructions are directly executed by a unit or units within the CISC microprocessor.

Referring now to FIG. 3, a flow diagram 300 is presented featuring a method according to the present invention for conducting a virtual smart phone controlled smart home demonstration, such as may be provided by the virtual home demonstration mechanism 200 of FIG. 2. Flow begins at block 301 where a user is routed to the cloud services 209 via selecting a hyperlink within the web browser 203. Flow then proceeds to block 301.

At block 302, the web browser 203 sends an HTTP request to the web host 209.3. Flow then proceeds to block 303.

At block 303, the web host 209.3 operates to download home and hub simulators 201-202 to the computer 204. Flow then proceeds to block 304.

At block 304, via known means, the simulation app download element 209.2 operates to cause the simulation app 211 to be downloaded to the smart phone 211. Flow then proceeds to decision block 305.

At decision block 305, the simulation app 211 executes on the smart phone 212 and determines if a user has initiated a home device control. If not, then flow proceeds to decision block 307. If so, then flow proceeds to block 306.

At block 306, the smart phone 212 transmits corresponding control messages to the cloud services 209. The cloud services 209 transmits hub control messages corresponding to the control messages to the smart hub simulator 202. The smart hub simulator 308 operates to transmit device control commands corresponding to the hub control messages to the virtual home simulator 201. And the virtual home simulator 201 causes scene manipulation commands to be transmitted to the web browser 203, thus creating simulated responses to the corresponding control messages on one or more of a plurality of virtualized smart home devices represented within the web browser 203. Flow then proceeds to decision block 307.

At decision block 307, the virtual home simulator 201 executes on the computer 204 and determines if a user or simulation has initiated a home device state change (e.g., temperature sensor increase, water sensor alarm). If not, then flow proceeds to decision block 309. If so, then flow proceeds to block 308.

At block 308, the virtual home simulator 201 causes the smart hub simulator 202 to transmit corresponding state change messages to the cloud services 209. The cloud services 209 transmits corresponding state change messages to the smart phone 212. And the simulator app 211 in the smart phone 212 represents the state changes to the user via audio/video alerts. Flow then proceeds to decision block 309.

At decision block 309, an evaluation is made to determine is the user has initiated a control to end the simulation. If not, then flow proceeds to decision block 305. If so, then flow proceeds to block 310.

At block 310, the method completes.

Advantageously, because the cloud services 209 are remote, the present invention provides for presentation and control of a plurality of virtualized smart home devices that does not require any special networking configuration to connect the smart phone 212 or the computer 204.

In addition, in contrast to a live demonstration, the demonstration according to the present invention allows for execution in any place in the world having connectivity links as are noted above.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, a microprocessor, a central processing unit, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be electronic (e.g., read only memory, flash read only memory, electrically programmable read only memory), random access memory magnetic (e.g., a floppy disk or a hard drive) or optical (e.g., a compact disk read only memory, or "CD ROM"), and may be read only or random access. Similarly, the transmission medium may be metal traces, twisted wire pairs, coaxial cable, optical fiber, or some other suitable transmission medium known to the art. The invention is not limited by these aspects of any given implementation.

The particular embodiments disclosed above are illustrative only, and those skilled in the art will appreciate that they can readily use the disclosed conception and specific embodiments as a basis for designing or modifying other structures for carrying out the same purposes of the present invention, and that various changes, substitutions and alterations can be made herein without departing from the scope of the invention as set forth by the appended claims.

What is claimed is:

1. A simulation environment for one or more virtualized smart home devices, comprising:
   a remote device;
   a computer; and
   a server system connected to the remote device and the computer;
      the server system comprising a processor and memory for storing one or more programs for execution by the processor, the one or more programs including instructions for:
         providing a simulation application to the remote device for controlling and monitoring states of the one or more virtualized smart home devices;
         providing a virtual home simulator to the computer;
         providing content related to the virtual home simulator to the computer to create the simulation environment, wherein the computer is configured to simulate the one or more virtualized smart home devices using the virtual home simulator;
         receiving a control command issued by the remote device from the simulation application, the control command defining a changed state of at least one of the one or more virtualized smart home devices; and
         in response to receiving the control command from the remote device, transmitting the control command to the computer, the control command causing the computer to change a simulated state of at least one of the one or more virtualized smart home devices in accordance with the changed state defined by the control command.

2. The simulation environment of claim 1, wherein the content is provided to the computer by a web host of the server system, and the web host downloads the virtual home simulator and a smart hub simulator to the computer, and wherein the computer executes the virtual home simulator and the smart hub simulator to simulate the one or more virtualized smart home devices.

3. The simulation environment of claim 2, wherein the smart hub simulator is configured to receive the corresponding control command and to issue smart device control commands to the virtual home simulator to control the one or more virtualized smart home devices.

4. The simulation environment of claim 3, wherein the smart hub simulator transmits the smart device control commands to the virtual home simulator in order to control the one or more virtualized smart home devices, and the one or more virtualized smart home devices correspond in operation to the one or more smart home devices.

5. The simulation environment of claim 1, wherein the virtual home simulator presents and changes the simulated state within a web browser that is executing on the computer.

6. The simulation environment of claim 1, wherein the one or more programs further comprise instructions for:

receiving from the virtual home simulator a state change message including the simulated state of the one or more virtualized smart home devices; and transmitting the state change message to the remote device.

7. The simulation environment of claim 1, wherein the control command is transmitted to the server system over a cellular network, and the server system transmits the control command to the computer over the Internet.

8. The simulation environment of claim 1, wherein the one or more programs further include instructions for:

providing the content to the computer to simulate the one or more state changes corresponding to the one or more virtualized smart home devices, wherein the control command includes a state change command, and the state changes are responsive to the state change command transmitted from the computer and represent simulated state changes in the one or more virtualized smart home devices.

9. A non-transitory computer readable storage storing one or more programs configured for execution by a server system connected to a remote device and a computer for demonstrating a simulation environment for one or more virtualized smart home devices, the one or more programs comprising instructions for:

providing a simulation application to the remote device for controlling and monitoring states of the one or more virtualized smart home devices;

providing a virtual home simulator to the computer;

providing content related to the virtual home simulator to the computer to create the simulation environment, wherein the computer is configured to simulate the one or more virtualized smart home devices using the virtual home simulator;

receiving a control command issued by the remote device from the simulation application, the control command defining a changed state of at least one of the one or more virtualized smart home devices; and in response to receiving the control command from the remote device, transmitting the control command to the computer, the control command causing the computer to change a simulated state of at least one of the one or more virtualized smart home devices in accordance with the changed state defined by the control command.

10. The non-transitory computer readable storage medium of claim 9, wherein the content is provided to the computer by a web host of the server system, and the web host downloads the virtual home simulator and a smart hub simulator to the computer, and wherein the computer executes the virtual home simulator and the smart hub simulator to simulate the one or more virtualized smart home devices.

11. The non-transitory computer readable storage medium of claim 9, wherein the smart hub simulator is configured to receive the corresponding control command and to issue smart device control command to the virtual home simulator to control the one or more virtualized smart home devices.

12. The non-transitory computer readable storage medium of claim 9, wherein the virtual home simulator presents and changes the simulated state within a web browser that is executing on the computer.

13. The non-transitory computer readable storage medium of claim 12, wherein the smart hub simulator transmits the smart device control commands to the virtual home simulator in order to control the one or more virtualized smart home devices, and the one or more virtualized smart home devices correspond in operation to the one or more smart home devices.

14. The non-transitory computer readable storage medium of claim 9, wherein the simulation application comprises a jar file.

15. The non-transitory computer readable storage medium of claim 9, wherein the one or more programs further include instructions for:

providing the content to the computer to simulate the one or more state changes corresponding to the one or more virtualized smart home devices, wherein the control command includes a state change command, and the state changes are responsive to the state change command transmitted from the computer and represent simulated state changes in the one or more virtualized smart home devices.

16. A method that provides a simulation environment for virtual use of one or more virtualized smart home devices, comprising:

a remote device;

a computer; and a server system connected to the remote device and the computer;

at the server system:

providing a simulation application to the remote device for controlling and monitoring states of the one or more smart home devices;

providing a virtual home simulator to the computer;

providing content related to the virtual home simulator to the computer to create the simulation environment, wherein the computer is configured to simulate the one or more virtualized smart home devices using the virtual home simulator;

receiving a control command issued by the remote device from the simulation application, the control command defining a changed state of at least one of the one or more virtualized smart home devices; and in response to receiving the control command from the remote device:

transmitting the control command to the computer, the control command causing the computer to change a simulated state at least one of the one or more virtualized smart home devices in accordance with the changed state defined by the control command.

17. The method of claim 16, further comprising:

providing a smart hub simulator to the computer, wherein the computer executes the virtual home simulator and the smart hub simulator to simulate the one or more virtualized smart home devices.

18. The method of claim 17, wherein the smart hub simulator receives the corresponding control command and issues smart device control commands to the virtual home simulator to control the one or more virtualized smart home devices.

19. The method of claim 16, wherein the virtual home simulator presents and changes the simulated state within a web browser that is executing on the computer.

20. The method of claim 19, wherein the smart hub simulator transmits the smart device control commands to the virtual home simulator in order to control the one or more virtualized smart home devices, and the one or more virtualized smart home devices correspond in operation to the one or more smart home devices.

21. The method of claim 16, further comprising:
receiving from the virtual home simulator a state change message including the simulated state of the one or more virtualized smart home devices; and
transmitting the state change message to the remote device.

22. The method of claim 16, wherein the control command is transmitted to the server system over a cellular network, and wherein the server system transmits the control command to the computer over the Internet.

23. The method of claim 16, further comprising:
providing the content to the computer to simulate the one or more state changes corresponding to the one or more virtualized smart home devices, wherein the control command includes a state change command, and the state changes are responsive to the state change command transmitted from the computer and represent simulated state changes in the one or more virtualized smart home devices.

* * * * *

UNITED STATES PATENT AND TRADEMARK OFFICE
CERTIFICATE OF CORRECTION

PATENT NO. : 9,922,580 B2  
APPLICATION NO. : 14/265121  
DATED : March 20, 2018  
INVENTOR(S) : Mathews et al.

Page 1 of 1

It is certified that error appears in the above-identified patent and that said Letters Patent is hereby corrected as shown below:

In the Claims

Claim 9, Column 11, Line 20, please delete "storage storing" and insert --storage medium storing--;

Claim 16, Column 12, Line 43, please delete "state at least" and insert --state of at least--.

Signed and Sealed this  
Fifth Day of June, 2018

Andrei Iancu  
*Director of the United States Patent and Trademark Office*